United States Patent
Wang et al.

(10) Patent No.: US 12,242,155 B2
(45) Date of Patent: Mar. 4, 2025

(54) BACK PLATE AND MANUFACTURING METHOD THEREOF, BACKLIGHT MODULE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Yaodong Wang, Beijing (CN); Yangli Zheng, Beijing (CN); Xiaoping Zhang, Beijing (CN); Luo Zhang, Beijing (CN); Quanzhou Liu, Beijing (CN); Fangyi Liu, Beijing (CN); Jian Ren, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/926,191

(22) PCT Filed: Nov. 30, 2021

(86) PCT No.: PCT/CN2021/134450
§ 371 (c)(1),
(2) Date: Nov. 18, 2022

(87) PCT Pub. No.: WO2023/097455
PCT Pub. Date: Jun. 8, 2023

(65) Prior Publication Data
US 2024/0219775 A1    Jul. 4, 2024

(51) Int. Cl.
*G02F 1/13357* (2006.01)

(52) U.S. Cl.
CPC .............................. *G02F 1/133608* (2013.01)

(58) Field of Classification Search
CPC ..................... G02F 1/133608; G02F 1/133314
See application file for complete search history.

(56) References Cited

U.S. PATENT DOCUMENTS

2011/0094358 A1    4/2011   Aramizu et al.
2021/0167327 A1    6/2021   Cai et al.

FOREIGN PATENT DOCUMENTS

| CN | 106521268 A  | 3/2017  |
|----|--------------|---------|
| CN | 108803143 A  | 11/2018 |
| CN | 109459880 A  | 3/2019  |
| CN | 110426895 A  | 11/2019 |
| CN | 209642752 U  | 11/2019 |
| CN | 110687713 A  | 1/2020  |
| CN | 110706584 A  | 1/2020  |
| CN | 210181255 U  | 3/2020  |

(Continued)

*Primary Examiner* — Karabi Guharay
(74) *Attorney, Agent, or Firm* — HOUTTEMAN LAW LLC (57) ABSTRACT

The present disclosure provides a back plate for use in a display apparatus, wherein the back plate includes: a bottom wall; a through hole in the bottom wall, wherein the through hole is provided with a hole wall protruding towards a side of the bottom wall, and the hole wall and the bottom wall are connected together and have a one-piece structure, wherein materials of the bottom wall and the hole wall each include an aluminum alloy material. The present disclosure further provides a manufacturing method of the back plate, a backlight module and a display apparatus.

14 Claims, 7 Drawing Sheets

(56) References Cited

FOREIGN PATENT DOCUMENTS

| | | |
|---|---|---|
| CN | 112083600 A | 12/2020 |
| CN | 212181213 U | 12/2020 |
| CN | 112666753 A | 4/2021 |
| CN | 113253516 A | 8/2021 |

BACK PLATE AND MANUFACTURING METHOD THEREOF, BACKLIGHT MODULE AND DISPLAY APPARATUS

TECHNICAL FIELD

The present disclosure relates to the technical field of display, and particularly to a back plate, a manufacturing method thereof, a backlight module and a display apparatus.

BACKGROUND

The liquid crystal display apparatus includes a display panel and a backlight module for providing backlight for the display panel, the backlight module includes a back plate, a light-emitting component and an optical film group, the back plate is provided with an accommodating space, and at least a part of the light-emitting component and the optical film group is arranged in the accommodating space. In some display apparatuses (e.g., mobile phones), it is necessary to form a through hole in the back plate, and the through hole is opposite to an image pickup device of the display apparatus.

SUMMARY

The embodiments of present disclosure provide a back plate, a manufacturing method thereof, a backlight module and a display apparatus.

In order to achieve the above object, the present disclosure provides a back plate for use in a display apparatus, wherein the back plate includes:
a bottom wall;
a through hole in the bottom wall, wherein the through hole is provided with a hole wall protruding towards a side of the bottom wall, and the hole wall and the bottom wall are connected together and have a one-piece structure,
wherein materials of the bottom wall and the hole wall each include an aluminum alloy material.

In some embodiments, the bottom wall has a tensile strength in a range of 320 Mpa to 390 Mpa, a yield strength in a range of 200 Mpa to 270 Mpa, a vickers hardness in a range of 100 HV to 120 HV, and an elongation in a range of 12% to 20%.

In some embodiments, the bottom wall has a thickness in a range of 0.09 mm to 1.01 mm, and the hole wall has a thickness in a range of 0.050 mm to 0.081 mm.

In some embodiments, a bent portion is formed at an end of the hole wall distal from the bottom wall, the bent portion and the hole wall have a one-piece structure, and bent portion extends towards a center of the through hole.

In some embodiments, the through hole has a rectangular longitudinal section.

In some embodiments, the bent portion is of an annular structure, and a width of the bent portion is in a range of 0.05 mm to 0.15 mm.

In some embodiments, the through hole have a trapezoidal longitudinal section having two top angles and two bottom angles, each of the two top angles is greater than 90°, and each of the two bottom angles is in a range of 80° to 90°.

In some embodiments, the hole wall has a plurality of shiny rings thereon, and the number of the shiny rings is greater than 3.

In some embodiments, the number of the shiny rings is 4 or 5.

In some embodiments, the hole wall has at least one shiny ring and one shiny band, the shiny band is on a side of the at least one shiny ring close to the bottom wall, and the shiny band has a width greater than a width of any shiny ring.

In some embodiments, a ratio of the width of the shiny band to the width of any one in the at least one shiny ring is in a range of 1.5 to 4.

In some embodiments, a diameter of an end of the through hole distal from the bottom wall is in a range of 2.5 mm to 4.5 mm.

In some embodiments, the bottom wall is provided with a first groove at a position close to the hole wall.

In some embodiments, the first groove has a width in a range of 0.08 mm to 0.12 mm and a depth in a range of 0.01 mm to 0.02 mm.

In some embodiments, the back plate further includes a side wall connected to the bottom wall, wherein the side wall and the bottom wall have a one-piece structure, and the side wall, the bottom wall and the hole wall define an accommodating space.

In some embodiments, the bottom wall is provided with a second groove at a position close to the side wall.

In some embodiments, the back plate is used in a display apparatus and the bottom wall is used for being arranged opposite to a display panel of the display apparatus.

An embodiment of the present disclosure further provides a backlight module, which includes the above-described back plate, wherein the backlight module further includes a backlight source, and at least a part of the backlight source is in the accommodating space.

In some embodiments, the side wall of the back plate has a first side surface, a second side surface and a top surface, the first side surface is opposite to the second side surface, the first side surface faces the accommodating space, and the top surface connects the first side surface and the second side surface together, and
the backlight module further includes a housing, and the housing surrounds the backlight source and is in contact with the first side surface and the top surface of the side wall of the back plate.

In some embodiments, a glue injection hole is formed at a junction of the side wall and the bottom wall, a third groove is formed on a surface of the bottom wall close to the accommodating space, a part of the housing is filled in the third groove, and at least a part of the third groove is on a side of the glue injection hole in a thickness direction of the side wall.

An embodiment of the present disclosure further provides a display apparatus, including the above-described back plate and a display panel, wherein the display panel is disposed opposite to the bottom wall of the back plate.

In some embodiments, the hole wall of the through hole of the back plate is provided with an adhesive thereon, the hole wall of the through hole is fixed and bonded to the display panel through the adhesive, an orthographic projection of the adhesive on the display panel is of an annular structure, and an inner diameter of the annular structure is in a range of 2.15 mm to 4.15 mm; or,
the display apparatus further includes a cover plate, which is on a light outgoing side of the display panel, the display panel is provided with a mounting hole, the hole wall of the through hole passes through the mounting hole, the hole wall of the through hole is provided with an adhesive thereon, the hole wall of the through hole is fixed and bonded to the cover plate through the adhesive, an orthographic projection of the adhesive on the cover plate is of an annular structure, and an inner diameter of the annular structure is in a range of 2.15 mm to 4.15 mm.

An embodiment of the present disclosure further provides a method for manufacturing the above-described back plate, wherein the method includes:

providing a substrate, wherein a material of the substrate includes an aluminum alloy material;

forming a through hole in the substrate through a punching process, wherein the through hole has a hole wall protruding towards a side of the substrate, wherein, the punching process includes:

stamping a target area of the substrate for a first time, to form a via penetrating through the substrate;

stamping the target area of the substrate for n times, so that the target area of the substrate is stretched for n times, and a bent portion is formed; the via is in the bent portion, a coverage of the bent portion on a plane, where the substrate is located, and a depth of the bent portion increase with the increase of the times of stamping, and a diameter of the via increases with the increase of the times of stamping; n is an integer greater than 1;

stamping the target area stretched for n times, for an $(n+2)^{th}$ time, so that the coverage and the depth of the bent portion and the diameter of the via meet target requirements, and stamping the target area for an $(n+3)^{th}$ time to form the through hole, wherein after the $(n+3)^{th}$ stamping, a side wall of the bent portion is formed as the hole wall of the through hole.

In some embodiments, $2 \leq n = 5$.

In some embodiments, when the target area of the substrate is stamped for each time, the stamping is performed with a punch pin, and vickers hardness of the punch pin is greater than or equal to 60 and less than 68.

BRIEF DESCRIPTION OF DRAWINGS

The accompanying drawings, which are included to provide a further understanding of the present disclosure and constitute a part of this specification, serve to explain the present disclosure together with the following specific embodiments, but do not constitute a limitation to the present disclosure. In the drawings.

DETAIL DESCRIPTION OF EMBODIMENTS

The embodiments of the present disclosure will be described in detail below with reference to the accompanying drawings. It should be understood that the embodiments described herein are only intended to illustrate and explain the present disclosure, but not to limit the present disclosure.

Unless otherwise defined, a technical or scientific term used herein shall have the ordinary meaning as understood by one of ordinary skill in the art to which the present disclosure belongs. The terms "first", "second", and the like, as used in the present disclosure, do not denote any order, quantity, or importance, but rather are used to distinguish one element from another. Similarly, the term "comprising", "comprises", or the like, means that the element or item appearing in front of the word "comprising" or "comprises" includes the element or item listed after the word "comprising" or "comprises" and its equivalents, and does not exclude other elements or items. The term "connected", "coupled" or the like is not restricted to a physical or mechanical connection, but may include an electrical connection, whether direct or indirect. The terms "upper", "lower", "left", "right", and the like are used merely to indicate relative positional relationships, which may also change accordingly when the absolute position of the object being described changes.

A liquid crystal display apparatus includes a display panel and a backlight module for providing backlight for the display panel. The backlight module includes a back plate, a light-emitting component and an optical film group. The back plate is provided with an accommodating space, and the light-emitting component and at least a part of the optical film group are arranged in the accommodating space. In some display apparatuses (e.g., mobile phones), it is necessary to form a through hole in the back plate, and the through hole may be opposite to an image pickup device of the display apparatus.

Figure 1:
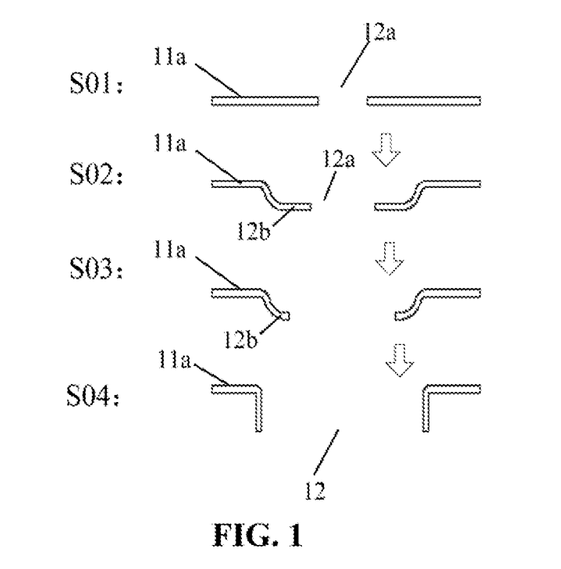
FIG. 1 is a schematic diagram illustrating how to form a through hole, in an example.

When manufacturing a back plate, a through hole may be formed in a substrate, and an edge of the substrate is bent to form a side wall of the back plate. FIG. 1 is a schematic diagram of a process for forming a through hole, provided in an example. As shown in FIG. 1, the process for forming the through hole includes steps S01 to S04.

Step S01, stamping a target area on a substrate 11a for a first time, to form a via 12a penetrating the substrate 11a.

Step S02, stamping the target area of the substrate 11a for a second time, so that the substrate 11a is stretched and a bent portion 12b is formed.

Step S03, stamping the target area of the substrate 11a for a third time, so that a coverage and a depth of the bent portion 12b and a diameter of the via 12a all meet target requirements.

Step S04, stretching the target area for a fourth time, to form a through hole 12. The through hole 12 has a rectangular longitudinal section, for example.

When the method shown in FIG. 1 is used to form a through hole in a substrate, the requirements on the tensile strength, a yield strength, a vickers hardness and an elongation of the substrate are high, so that when a through hole with a small diameter (for example, a diameter less than 4.0 mm) is formed, no hole crack occurs. Therefore, in the related art, the substrate 11a is made of stainless steel, thereby obtaining a stainless steel back plate having a through hole. In one example, the stainless steel substrate has tensile strength in a range of 900 Mpa to 950 Mpa, a yield strength in a range of 650 Mpa to 680 Mpa, a vickers hardness in a range of 300 HV to 330 HV, and an elongation in a range of 25% to 40%, and a thickness of the substrate 11a is 0.1 mm. When a through hole 12 with a diameter of 2.94 mm is formed by the method in FIG. 1, after the through hole is stretched for four times in the steps S01 to S04, a thickness of a hole wall of the through hole 12 is in a range of 0.05 mm to 0.06 mm, so that a high yield can be ensured.

However, the stainless steel back plate is heavy, which does not meet requirements on the reduced weight of an electronic device (e.g., a display screen, a mobile terminal). Especially in the mobile terminal (e.g., a mobile phone, a tablet computer), the market has a strong demand for light weight, so the back plate needs to be made of a lighter material.

Figure 2A:
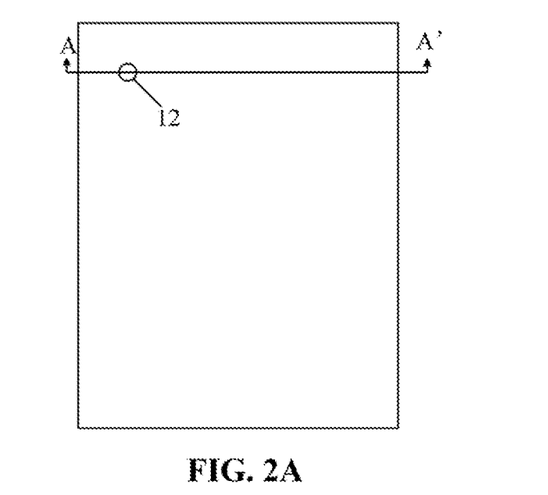
FIG. 2A is a plan view of a back plate provided in some embodiments of the present disclosure.
Figure 2B:
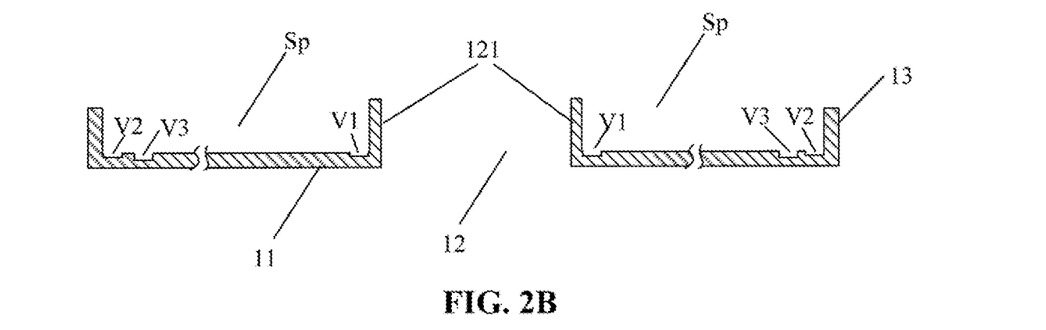
FIG. 2B is a cross-sectional view taken along a line A-A' in FIG. 2A provided in some embodiments of the present disclosure.

An embodiment of the present disclosure provides a back plate. FIG. 2A is a plan view of a back plate provided in some embodiments of the present disclosure, and FIG. 2B is a cross-sectional view taken along a line A-A' in FIG. 2A provided in some embodiments of the present disclosure. As shown in FIGS. 2A and 2B, the back plate includes a bottom wall 11 and a through hole 12 provided in the bottom wall 11. In one example, the back plate may be used in a display apparatus, in which case the through hole 12 may be disposed opposite to an image capture device (e.g., a camera assembly) of the display apparatus. The through hole 12 has a hole wall 121 protruding towards the bottom wall 11 (i.e., the hole wall 121 protrudes from the bottom wall 11 in the thickness direction of the bottom wall 11), and the hole wall 121 is connected to the bottom wall 11 so that the hole wall 121 and the bottom wall 11 have a one-piece structure. In this case, the through hole 12 may be formed in the bottom wall 11 through a punching process. The bottom wall 11 and the hole wall 121 are both made of an aluminum alloy material.

The aluminum alloy material has a lower density than that of the stainless steel material, and therefore, in the embodiments of the present disclosure, when the aluminum alloy material is used as the material of the bottom wall 11 and the hole wall 121, the weight of the back plate may be reduced, thereby reducing the weight of the entire display apparatus. Meanwhile, the aluminum alloy material has better heat conductivity, which is beneficial to heat dissipation of the display screen and surrounding electronic elements.

In some embodiments, as shown in FIG. 2B, the back plate may further include a side wall 13. The side wall 13 and the bottom wall 11 are connected to each other so that the side wall 13 and the bottom wall 11 have a one-piece structure. The side wall 13, the bottom wall 11 and the hole wall 121 define an accommodating space Sp, which may be used to accommodate at least a part of the backlight source, such as a light-emitting component and a light guide plate; and may also be used to accommodate at least a part of the display panel.

In a manufacturing process of the back plate, a through hole 12 may be first formed in the substrate of the aluminum alloy material through a punching process. Then, an edge of the substrate is bent, a bent portion serves as the side wall 13 of the back plate, and a non-bent portion serves as the bottom wall 11 of the back plate. Since the aluminum alloy material has much lower tensile strength, yield strength, vickers hardness and elongation than the stainless steel material, if a through hole with a small diameter is formed in an aluminum alloy substrate by the method shown in FIG. 1, a hole crack will occur. It is verified that for the substrate with a tensile strength of 374 MPa, a yield strength of 262, a vickers hardness of 115 HV, an elongation of 18.1% and a thickness of 1.0 mm, when the through hole 12 with a rectangular longitudinal section and a diameter of 2.94 mm is formed in the substrate 11a through the above-described steps S01 to S04, the thickness of the hole wall 121 reaches 0.083, which indicates that the material is not fully stretched in the stretching process. In this case, the probability of occurrence of a hole crack is very high.

Therefore, an embodiment of the present disclosure provides a method for manufacturing a through hole, by which the through hole may be formed in an aluminum alloy substrate, and the probability of occurrence of a hole crack is reduced, so as to achieve the purpose of using an aluminum alloy material to manufacture a back plate.

Figure 3A:
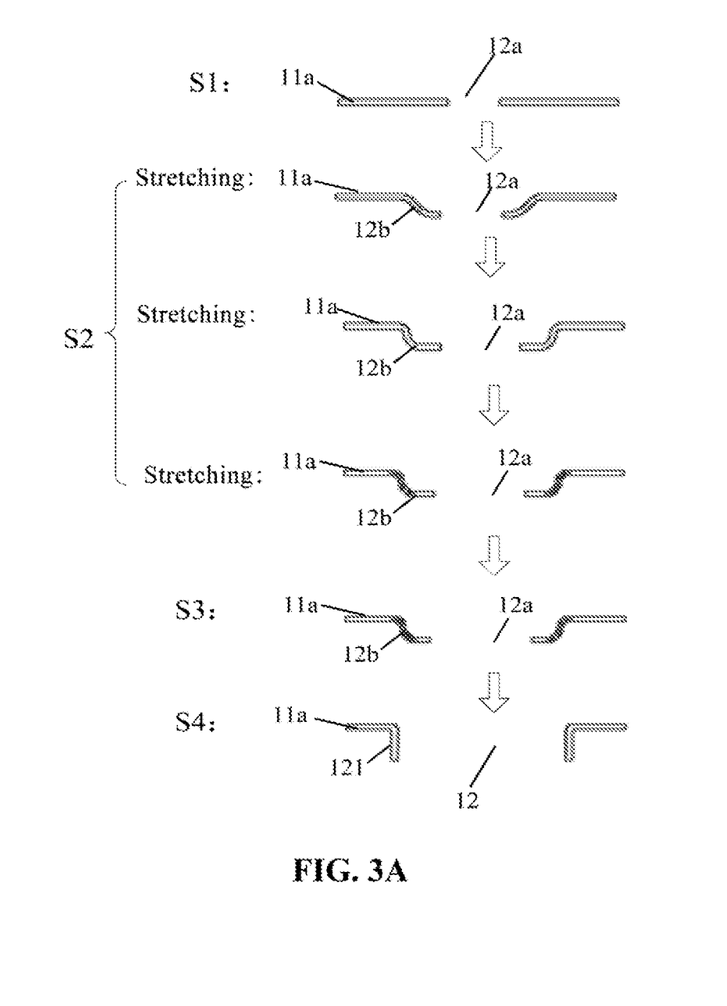
FIG. 3A is a schematic diagram illustrating how to fabricate a through hole, in some embodiments of the present disclosure.

FIG. 3A is a schematic diagram illustrating how to fabricate a through hole, in some embodiments of the present disclosure. As shown in FIG. 3A, a procedure of forming the through hole 12 through a punching process includes:

Step S1, stamping a target area of the substrate 11a for a first time, to form a via 12a penetrating the substrate 11a.

Step S2, stamping the target area of the substrate 11a for n times, so that the target area of the substrate 11a is stretched for a plurality of times, and a bent portion 12b is formed. The via 12a is located in the bent portion 12b, a coverage of the bent portion 12b on a plane, where the substrate 11a is located, and a depth of the bent portion 12b increase with an increase of the times of stamping, and a diameter of the via 12a increases with the increase of the times of stamping. n is an integer greater than 1.

Step S3, stamping the target area stretched for n times, for an (n+2)th time, so that the coverage of the bent portion 12b on the plane, where the substrate 11a is located, the depth of the bent portion 12b, and the diameter of the via 12a all meet target requirements.

Step S4, stamping the target area of the substrate 11a for an (n+3)th time to mold the target area, thereby forming the through hole 12. After the (n+3)th stamping, a side wall of the bent portion 12b is formed as a hole wall 121 of the through hole 12.

That is, in the procedure of forming the through hole 12, after the target area is stamped and the via 12a is formed, the target area of the substrate 11a is further stretched for a plurality of times, and then is stamped and molded, thereby obtaining the through hole 12 of a desired size. Thus, the substrate 11a may be fully stretched, and the substrate 11a may be gradually deformed, so that an internal stress during stamping may be reduced. Thus, when the through hole 12 with a smaller diameter is manufactured, the hole crack defect may be reduced or prevented, and the product quality may be improved.

In this case, each stamping operation is performed using a punch pin having a hardness greater than a hardness of the substrate 11a. Every time the punch pin is in contact with the substrate 11a, the substrate 11a is subjected to an instantaneous force, so that a circle of marks called a shiny ring is formed on the substrate by the force. It can be understood that the number of the shiny rings is one less than the times of stamping. For example, when the times of stamping is 6, the number of the shiny rings is 5. In an embodiment of the present disclosure, the through hole 12 is formed through the steps S1 to S4, n in the step S2 is greater than 1, and the times of stamping is greater than 4, so that a plurality of shiny rings are formed on the hole wall 121 of the finally formed through hole 12, and the number of the shiny rings is greater than 3. For example, the number of the shiny rings is 4, 5 or 6. When n is greater or lower, it is possible to result in a hole crack. It is preferable that n is 3, in which case the through hole 12 may have a higher manufacturing yield than a case of n being any other value, and the number of the shiny rings is 5.

Figure 3B:
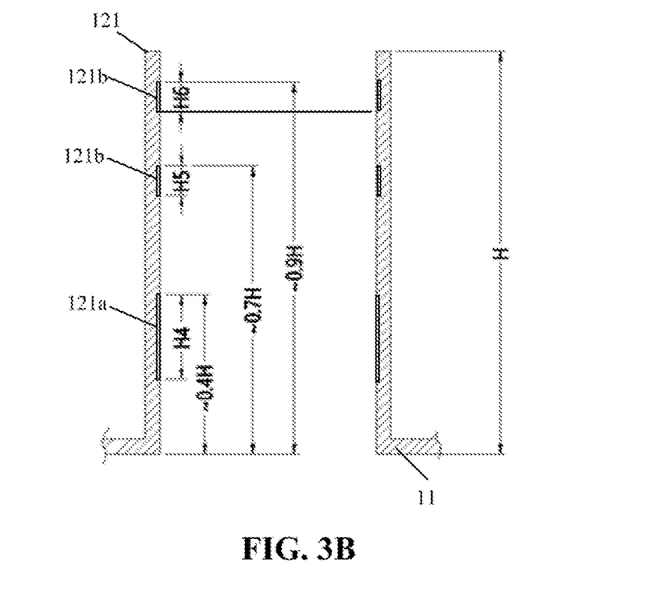
FIG. 3B is a schematic diagram illustrating a distribution of shiny rings and shiny bands provided in some embodiments of the present disclosure.

FIG. 3B is a schematic diagram illustrating a distribution of shiny rings and shiny bands provided in some embodiments of the present disclosure. As shown in FIG. 3B, in some embodiments, at least two of the shiny rings formed in the step S2, which are close to each other, may be in contact with or partially overlap each other, so that a shiny band is formed. In this case, the hole wall 121 has at least one shiny ring 121b and one shiny band 121a thereon, the shiny band 121a is located on a side of the at least one shiny ring close to the bottom wall 11, and a width H4 of the shiny band 121a is greater than a width H5 (or H6) of any one shiny ring. In some examples, the shiny band 121a is formed by stampings for a plurality of times (e.g., 2 or 3 times), where a ratio of the width H4 of the shiny band 121a to the width H5 (or H6) of any one shiny ring 121b is in a range of 1.5 to 4 (including 1.5 and 4). When the shiny band 121a is formed by stampings for three times, and the ratio of the width H4 of the shiny band 121a to the width H5 (or H6) of any one shiny ring 121b is in a range of 2 to 4 (including 2 and 4), the through hole 12 may have a higher manufacturing yield than the case when the shiny band 121a is formed by stampings for other times. For example, the hole wall 121 has two shiny rings 121b and one shiny band 121a thereon, a distance from an end of the shiny band 121a distal from the bottom wall 11 to a surface of the bottom wall 11 of the back plate distal from the shiny band 121a is 0.3 to 0.5 times of a farthest distance H from the hole wall 121 to the surface of the bottom wall 11 of the back plate distal from the shiny band 121a, a distance from an end of one shiny ring 121b distal from the bottom wall 11 to the surface of the bottom wall 11 of the back plate distal from the shiny band 121a is in a range of 0.6 H to 0.8 H, and a distance from an end of the other shiny ring 121b distal from the bottom wall 11 to the surface of the bottom wall 11 of the back plate distal from the shiny band 121a is in a range of 0.85 H to 0.95 H. In one specific embodiment, the distance from an end of the shiny band 121a distal from the bottom wall 11 to the surface of the bottom wall 11 distal from the shiny band 121a is 0.4 times of the distance H, the distance from an end of one shiny ring 121b distal from the bottom wall 11 to the surface of the bottom wall 11 distal from the shiny band 121a is 0.7 H, and the distance from an end of the other shiny ring 121b distal from the bottom wall 11 to the surface of the bottom wall 11 distal from the shiny band 121a is 0.9 H.

The punching process disclosed by the embodiment of the present disclosure may be suitable for manufacturing the through hole 12 with a small diameter. In some embodiments, a cross section of the through hole 12 is circular, and a diameter of the through hole 12 may be in a range of 2.5 mm to 4.5 mm. For example, the diameter may be in a range of 2.5 mm to 2.8 mm, in a range of 2.7 mm to 2.8 mm, in a range of 2.8 mm to 3.5 mm, in a range of 3.5 mm to 3.8 mm, in a range of 3.8 mm to 4.0 mm, or in a range of 4.0 mm to 4.5 mm. For example, the diameter of the through hole 12 is 2.5 mm, 2.6 mm, 2.7 mm, 2.8 mm, 2.9 mm, 3.0 mm, 3.1 mm, 3.2 mm, 3.3 mm, 3.4 mm, or 3.5 mm.

As shown in FIG. 2B, a longitudinal section of the through hole 12 may be rectangular, i.e., the longitudinal section of the hole wall 121 is perpendicular to the bottom wall 11. It should be noted that "perpendicular to" herein means that an included angle between the two structures is in a range of 90°-3° to 90°+3°.

The back plate in the embodiments of the present disclosure may be used in a display apparatus, in which case the bottom wall 11 of the back plate is used to be disposed opposite to a display panel of the display apparatus. For example, the display panel may be a self-luminous display panel such as an OLED display panel, a QLED display panel, a QD-OLED display panel, a Mini-LED display panel, or the like, in which case the accommodating space Sp of the back plate is used to accommodate at least a part of the self-luminous display panel. For another example, the display panel is a liquid crystal display panel, in which case, at least a part of the backlight source may be disposed in the accommodating space Sp of the back plate, and the backlight source may be an edge-lit backlight source or a direct-lit backlight source, for example. Where the backlight source is an edge-lit backlight source, the backlight source includes a light guide plate and a light bar. The light guide plate is at least partially located in the accommodating space Sp, wherein the light guide plate is provided with an avoiding hole, and the hole wall 121 passes through the avoiding hole. Where the backlight source is a direct-lit backlight source, the backlight source includes a direct-lit lamp board, on which self-luminous point light sources may be arranged in an array. The direct-lit lamp board is at least partially located in the accommodating space Sp, wherein the direct-lit lamp board is provided with an avoiding hole, and the hole wall 121 passes through the avoiding hole.

Figure 4:
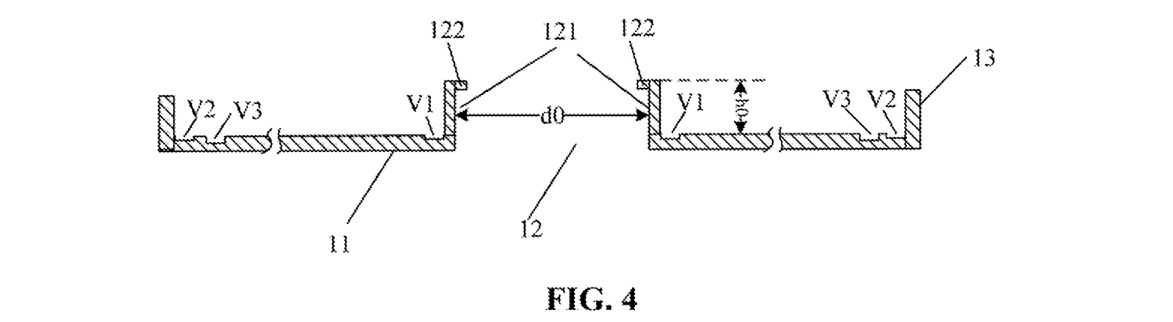
FIG. 4 is a cross-sectional view taken along a line A-A' in FIG. 2A provided in other embodiments of the present disclosure.

In one specific embodiment, the accommodating space Sp is used for accommodating the backlight source and the optical film group, the optical film group may include a plurality of optical films, each of the optical films may have an avoiding hole, and the hole wall 121 passes through the avoiding hole. Referring to FIG. 4, a height of the hole walls 121 is defined as a vertical distance h0 from a position of the hole wall 121 farthest from the bottom wall 11 of the back plate to the bottom wall 11 of the back plate. In some embodiments, the height of the hole wall 121 may be in a range of 0.65 mm to 0.78 mm, so that the hole wall 121 may pass through the avoiding holes of all the optical films, thereby stabilizing each optical film.

In an embodiment, where k number of optical films are sequentially stacked on a side of the backlight source distal from the bottom wall 11 of the back plate, the height of the hole wall 121 is set to be slightly higher than a distance from a side of the kth optical film distal from the bottom wall of the back plate to the bottom wall 11 of the back plate. Such an arrangement may prevent the light of the light source from entering the avoiding hole as much as possible. Where the avoiding hole is used for collecting optical information, such a design may avoid crosstalk caused by the light of the backlight source to optical collection. Specifically, for an edge-lit backlight source, where the plurality of optical films of the optical film group include a reflective sheet, a diffusion film and a composite prism film, the reflective sheet, the light guide plate, the diffusion film and the composite prism film are sequentially stacked on the bottom wall of the back plate, and the height of the hole wall 121 may be set to be in a range of 0.65 mm to 0.72 mm, for example, the height of the hole wall 121 is 0.65 mm, 0.67 mm, 0.69 mm, 0.70 mm, or 0.72 mm. Where the plurality of optical films of the optical film group include a reflective sheet, a light guide plate, a diffusion film, and two prism films, the reflective sheet, the light guide plate, the diffusion film and the two prism films are sequentially stacked on the bottom wall 11 of the back plate, the height of the hole wall 121 may be set to be in a range of 0.72 mm to 0.78 mm, for example, the height of the hole wall 121 is 0.72 mm, 0.75 mm, 0.77 mm, or 0.78 mm. It can be understood that where the backlight source is an edge-lit backlight source, the side of the backlight source distal from the bottom wall of the back plate is a side of the light guide plate distal from the bottom wall 11 of the back plate; where the backlight source is a direct-lit backlight source, the side of the backlight source distal from the bottom wall 11 of the back plate is a light outgoing side of the lamp board. In addition, the height of the hole wall 121 is slightly less than a distance from a surface of the housing 15 distal from the bottom wall 11 to the bottom wall 11. This may prevent the hole wall 121 from applying a great pressure to the display panel 30 after the display panel 30 and the backlight module are assembled together. Therefore, a phenomenon of yellowing of the picture caused by squeezing the display panel is prevented, thereby improving the display effect. Specifically, the height of the hole wall 121 is denoted by h0, the distance from the side of the kth optical film distal from the bottom wall of the back plate to the bottom wall 11 of the back plate is denoted by h1, and the distance from the surface of the housing 15 distal from the bottom wall 11 to the bottom wall 11 is denoted by h2, then h2>h0>h1. In an embodiment, (h0−h1) is not greater than 0.05 mm, and (h2−h1) is in a range of 0.015 mm to 0.03 mm.

In some embodiments, the bottom wall 11 has a tensile strength in a range of 320 Mpa to 390 Mpa, a yield strength in a range of 200 Mpa to 270 Mpa, a vickers hardness in a range of 100 HV to 120 HV, and an elongation in a range of 12% to 20%, a thickness of the bottom wall 11 is in a range of 0.09 mm to 1.01 mm, and a thickness of the hole wall 121 is in a range of 0.050 mm to 0.081 mm, so that the bottom wall 11 has a large tensile strength and a high elongation to reduce or prevent hole crack defect from occurring.

Illustratively, the tensile strength of the bottom wall 11 is in a range of 320 MPa to 330 MPa, in a range of 330 MPa to 350 MPa, in a range of 350 MPa to 360 MPa, in a range of 360 MPa to 370 MPa, or in a range of 370 MPa to 390 MPa. For example, the tensile strength of the bottom wall 11 is 320 MPa, 325 MPa, 330 MPa, 335 MPa, 340 MPa, 350 MPa, 355 MPa, 360 MPa, 365 MPa, 370 MPa, 375 MPa, 380 MPa, 385 MPa, or 390 MPa. Illustratively, the yield strength of the bottom wall 11 is in a range of 200 MPa to 230 MPa, in a range of 230 MPa to 250 MPa, or in a range of 250 MPa to 270 MPa. For example, the yield strength of the bottom wall 11 is 200 MPa, 210 MPa, 220 MPa, 230 MPa, 240 MPa, 250 MPa, 260 MPa, or 270 MPa. Illustratively, the vickers hardness of the bottom wall 11 is in a range of 100 HV to 105 HV, in a range of 105 HV to 110 HV, in a range of 110 HV to 115 HV, or in a range of 115 HV to 120 HV. For example, the vickers hardness of the bottom wall 11 is 100 HV, 103 HV, 105 HV, 107 HV, 110 HV, 112 HV, 115 HV, 118 HV, or 120 HV.

Illustratively, the elongation of the bottom wall 11 is in a range of 12% to 15%, in a range of 15% to 18%, or in a range of 18% to 20%. For example, the elongation of the bottom wall 11 is 12%, 13%, 14%, 15%, 16%, 17%, 18%, 19%, or 20%. Illustratively, the thickness of the bottom wall 11 is in a range of 0.095 mm to 1.005 mm, and the thickness of the hole wall 121 is in a range of 0.05 mm to 0.06 mm, in a range of 0.06 mm to 0.07 mm, or in a range of 0.07 mm to 0.081 mm. For example, the thickness of the bottom wall 11 is 0.09 mm, 0.095, 0.1 mm, or 0.105 mm; and the thickness of the hole wall 121 is, for example, 0.05 mm, 0.06 mm, 0.061 mm, 0.065 mm, 0.07 mm, or 0.081 mm.

In an embodiment, the bottom wall 11 has a tensile strength of 374 MPa, a yield strength of 262, a vickers hardness of 115 HV, and an elongation of 18.1%, the thickness of the bottom wall 11 is 1.0 mm, and the thickness of the hole wall 121 is 0.061 mm, so that the bottom wall 11 may be fully stretched and the occurrence of hole cracks is reduced to the greatest possible extent.

In one specific embodiment, the bottom wall 11 may be made of aluminum magnesium alloy. The strength and the surface hardness of the bottom wall 11 may be improved by adopting the aluminum magnesium alloy, and the scratch defect rate is reduced.

The inventor of the present disclosure performed experimental verification on the yield of the through hole 12 formed in steps S1 to S4, wherein the bottom wall 11 has a tensile strength of 374 MPa, a yield strength of 262, a vickers hardness of 115 HV, and an elongation of 18.1%, a thickness of the bottom wall 11 is 1.0 mm, a longitudinal section of the through hole 12 is rectangular, and a diameter of the through hole 12 is 2.94 mm. Where n is 3 in step S2, a thickness of the hole wall 121 is 0.061 mm, which indicates that the material is fully stretched in the stretching process, and in this case, compared to the case of forming the through hole 12 in steps S01 to S04, the hole crack defect rate is greatly reduced.

In view of the low strength of the aluminum alloy material, the hole wall 121 is likely to undergo resilient deformation after the through hole 12 is formed in the substrate. To prevent this, in some embodiments, as shown in FIG. 2B, the bottom wall 11 is provided with a first groove V1 at a position close to the hole wall 121. The first groove V1 may be adjacent to the hole wall 121, i.e., no space exists between the first groove V1 and the hole wall 121. The first groove V1 may prevent the hole wall 121 from recovering after the through hole 12 is formed in the substrate. The first groove V1 may be formed in the bottom wall 11 through a beading process.

The first groove V1 may be an annular structure surrounding the through hole 12. Where a width and a depth of the first groove V1 are low, it is not sufficient to reduce the resilience of the hole wall 121; where the width and the depth of the first groove V1 are great, the bottom wall 11 is easily deformed during forming the first groove V1 through the beading process. In view of this, in some embodiments, the width of the first groove V1 is in a range of 0.08 mm to 0.12 mm, and the depth of the first groove V1 is in a range of 0.01 mm to 0.02 mm, so as to minimize the resilience of the hole wall 121, prevent the bottom wall 11 from being deformed, and improve the flatness of the surface of the bottom wall 11 distal from the display panel.

Illustratively, the width of the first groove V1 is 0.08 mm, 0.09 mm, 0.1 mm, 0.11 mm, or 0.12 mm; and the depth of the first groove V1 is 0.01 mm, 0.012 mm, 0.014 mm, 0.016 mm, 0.018 mm, or 0.02 mm.

As described above, the edge of the substrate is bent to form the side wall 13 of the back plate. Similarly, in order to prevent the side wall 13 from recovering, a second groove V2 may be provided in the bottom wall 11 at a position close to the side wall 13, and the second groove V2 may be in contact with the side wall 13. In some embodiments, a width of the second groove V2 is in a range of 0.08 mm to 0.12 mm, and a depth of the second groove V2 is in a range of 0.01 mm to 0.02 mm, so as to minimize the resilience of the side wall 13 and improve the flatness of the surface of the bottom wall 11 distal from the display panel.

Figure 2C:
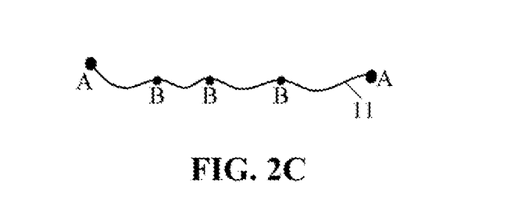
FIG. 2C is a schematic diagram illustrating a warpage of a bottom wall.

In some examples, the flatness of the surface of the bottom wall 11 distal from the accommodating space (referred to as a bottom surface of the bottom wall 11) is required as below: when the bottom wall 11 was placed on a load-bearing platform, a distance from a tortoise upwarping position on the bottom surface of bottom wall 11 to the load-bearing platform should not exceed 0.1 mm, and a distance from a bowl upwarping position on the bottom surface of bottom wall 11 to the load-bearing platform should not exceed 0.8 mm. FIG. 2C is a schematic diagram illustrating a warpage of the bottom wall. As shown in FIG. 2C, the bowl warping position A is located at an edge of the bottom wall 11, and the tortoise warping position B is located in the middle of the bottom wall 11 and is in a wave crest shape.

FIG. 4 is a cross-sectional view taken along a line A-A' in FIG. 2A provided in other embodiments of the present disclosure. A structure shown in FIG. 4 is similar to that shown in FIG. 2B. As shown in FIG. 4, the bottom wall 11 is provided with a through hole 12, a hole wall 121 of the through hole 12 is connected to the bottom wall 11 so that the hole wall 121 and the bottom wall 11 have a one-piece structure. Materials of the bottom wall 11 and the hole wall 121 of the through hole 12 both include aluminum alloy materials. A longitudinal section of the through hole 12 is rectangular. The bottom wall 11 may be provided with a first groove V1 and a second groove V2.

An inner surface of the side wall 13 is provided with more than three shiny rings. Various performance parameters of the bottom wall 11, a thickness of the bottom wall 11, a thickness of the hole wall 121, a height and a diameter of the through hole 12, a depth and a width of the first groove V1, and a depth and a width of the second groove V2 all may be referred to the description of FIG. 2B above. Only differences between FIGS. 4 and 2B will be described below.

In some embodiments, referring to FIG. 4, an end of the hole wall 121 distal from the bottom wall 11 is provided with a bent portion 122, the bent portion 122 and the hole wall 121 have a one-piece structure, and the bent portion 122 extends towards a center of the through hole 12. By providing the bent portion 122, stress applied to a top of the hole wall 121 may be further reduced, thereby further reducing the occurrence of hole cracks. It should be noted that where the end of the hole wall 121 distal from the bottom wall 11 is provided with the bent portion 122, the height h0 of the hole wall 121 should be understood as a distance from a farthest point of the bent portion 122 from the bottom wall 11 of the back plate to the bottom wall 11 of the back plate.

In some embodiments, the bent portion 122 has an annular structure, to make the stress applied to each position at the top of the hole wall 121 be more uniform.

A width of the annular structure is in a range of 0.05 mm to 0.15 mm, so that stress on the end of the hole wall 121 distal from the bottom wall 11 is reduced as much as possible, and hole crack defect is reduced. For example, the width of the annular structure is 0.05 mm, 0.08 mm, 0.1 mm, 0.12 mm, or 0.15 mm.

The annular structure may be parallel or basically parallel to the bottom wall 11, i.e., an included angle between a plane, where the annular structure is located, and the plane, where the bottom wall 11 is located, is in a range of 0° to 5°.

For the through hole 12 in FIG. 4, the punching process of step S1 to step S4 described in the above may be also employed. In some embodiments, n in step S2 is 2, 3 or 4, i.e., the through hole in FIG. 4 is formed by stampings of 5, 6 or 7 times. The stamping process in step S4 is to mold the bent portion, and not form the shiny ring. Therefore, in some embodiments, when the shiny rings formed by the stampings in step S2 are spaced apart from each other, the hole wall 121 has 3, 4 or 5 shiny rings thereon. In an embodiment, when n=3, the hole wall 121 has 4 shiny rings, and in this case, a highest manufacturing yield of the through hole 12 may be obtained.

In other embodiments, when the through hole 12 in FIG. 4 is formed, two adjacent shiny rings formed in step S2 are in contact with or partially overlap each other, thereby forming a shiny band. In other words, the shiny rings formed by all the stampings in step S2 form a shiny band. In this case, the hole wall 121 has one shiny ring and one shiny band, and the shiny band is located on a side of the shiny ring close to the bottom wall 11. A width of the shiny band is greater than a width of the shiny ring. In some examples, the shiny band is formed by stamping for two or three times, where a ratio of the width of the shiny band to the width of any one shiny ring is in a range of 1.5 to 4. In some examples, a shiny band is formed by stamping for three times, the ratio of the width of the shiny band to the width of the shiny ring is in a range of 2 to 4, and the highest manufacturing yield of the through hole 12 may be obtained relative to where the shiny band is formed by stamping for other times.

Actual measurement results for the through hole 12 shown in FIG. 4 are as follows: the bottom wall 11 has a tensile strength of 374 MPa, a yield strength of 262, a vickers hardness of 115 HV, and an elongation of 18.1%, a thickness of the bottom wall 11 is 1.0 mm, a longitudinal section of the through hole 12 is rectangular, a diameter do of the through hole 12 is 2.94 mm, the bent portion 122 is annular, a width of the bent portion 122 is 0.1 mm, and a height of the hole wall 121 is 0.69 mm. When the punching process of steps S1 to S4 described in the above is adopted and n is 3 in step S2, a thickness of the hole wall 121 is 0.065 mm, and a further decrease in the hole crack defect rate is detected. It should be noted that, for the through hole 12, the diameter is an inner diameter (for example, a size indicated by do in FIG. 4) of the hole wall 121, regardless of the bent portion 122.

Figure 5:
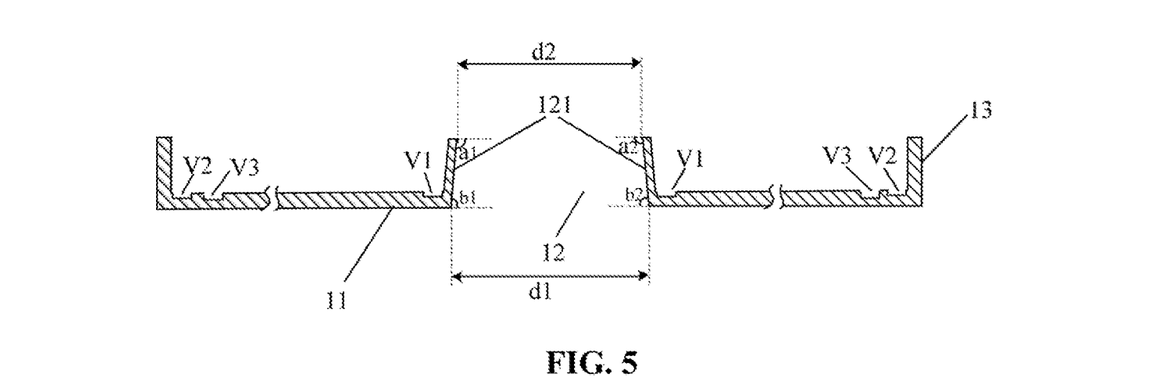
FIG. 5 is a cross-sectional view taken along a line A-A' of FIG. 2A provided in other embodiments of the present disclosure.

FIG. 5 is a cross-sectional view taken along a line A-A' in FIG. 2A provided in other embodiments of the present disclosure. A structure shown in FIG. 5 is similar to the structure shown in FIG. 2B. As shown in FIG. 5, the bottom wall 11 is provided with a through hole 12, a hole wall 121 of the through hole 12 is connected to the bottom wall 11 so that the hole wall 121 and the bottom wall 11 have a one-piece structure. Materials of the bottom wall 11 and the hole wall 121 of the through hole 12 both include aluminum alloy materials. The bottom wall 11 may be provided with a first groove V1 and a second groove V2.

An inner surface of the side wall 13 is provided with more than three shiny rings. Various performance parameters of the bottom wall 11, a thickness of the bottom wall 11, a thickness of the hole wall 121, a height of the through hole 12, a depth and a width of the first groove V1, and a depth and a width of the second groove V2 all may be referred to the description of FIG. 2B above. Only differences between FIGS. 5 and 2B will be described below.

In FIG. 5, a cross-sectional area of the through hole 12 decreases in a direction distal from the bottom wall 11, and such a structure may also reduce the stress applied to the top of the hole wall 121, thereby further reducing the occurrence of hole cracks.

In some embodiments, a longitudinal section of the through hole 12 has a shape of a trapezoid having two top angles (a1 and a2 as shown in FIG. 5) and two bottom angles (b1 and b2 as shown in FIG. 5), each top angle is greater than 90°, and each bottom angle is in a range of 80° to 90°, thereby improving the stability of the through hole 12. The trapezoid may be an isosceles trapezoid, i.e., a1-a2, and b1=b2. An diameter d1 of an end of the through hole 12 close to the bottom wall 11 may be the same as the diameter of the through hole 12 in FIG. 2B, the diameter d2 of an end of the through hole 12 distal from the bottom wall 11 is less than d1, and a difference between d2 and d1 may be in a range of 0.05 mm to 0.15 mm. For example, the difference between d2 and d1 is 0.05 mm, 0.08 mm, 0.1 mm, 0.12 mm, or 0.15 mm.

For the through hole 12 in FIG. 5, the shiny ring formed on the hole wall 121 may be similar to the shiny ring on the hole wall 121 in FIG. 3B. In some embodiments, the through hole 12 of FIG. 5 is formed through the above steps S1-S4, and the number of the shiny rings on the hole wall 121 is one less than the times of stamping. For example, when the times of stamping is 6, the number of the shiny rings is 5. In some embodiments, n in step S2 is greater than 1, and the times of stamping is greater than 4, so that a plurality of shiny rings are formed on the hole wall 121 of the finally formed through hole 12, and the number of the shiny rings is greater than 3. In an embodiment, n=3, and the highest manufacturing yield of the through hole 12 may be obtained compared to a case of n being other values. In this case, the number of the shiny rings is 5.

In other embodiments, when forming the through hole 12 in FIG. 5, at least two of the shiny rings formed in step S2 are close to each other to be in contact with each other or partially overlap each other, thereby forming a shiny band. In this case, the hole wall 121 has at least one shiny ring and one shiny band thereon, the shiny band is located on a side of the at least one shiny ring close to the bottom wall 11, and a width of the shiny band is greater than a width of any shiny ring. In some examples, the shiny band is formed by stamping for two or three times, where a ratio of the width of the shiny band to the width of any one shiny ring is in a range of 1.5 to 4. For example, the hole wall 121 has two shiny rings and one shiny band thereon. In an embodiment, the shiny band is formed by stamping for three times, the ratio of the width of the shiny band to the width of any shiny ring is in a range of 2 to 4, and the highest manufacturing yield of the through hole 12 may be obtained relative to where the shiny band is formed by stamping for other times.

Actual measurement results for the through hole 12 shown in FIG. 5 are as follows: the bottom wall 11 has a tensile strength of 374 MPa, a yield strength of 262 MPa, a vickers hardness of 115 HV, and an elongation of 18.1%, a thickness of the bottom wall 11 is 1.0 mm, a longitudinal section of the through hole 12 is trapezoidal, a diameter of an end of the through hole 12 close to the bottom wall 11 is 2.94 mm, a diameter of an end of the through hole 12 distal from the bottom wall 11 is 2.74 mm, and a height of the hole wall 121 is 0.69 mm. When the punching process of steps S1 to S4 described in the above is adopted and n in step S2 is 3, a thickness of the hole wall 121 is 0.063 mm, and it is detected that the hole crack defect rate is further reduced compared to the case in FIG. 2.

It will be understood that for the structure shown in FIG. 5, an end of the hole wall 121 distal from the bottom wall 11 is provided with a bent portion, the bent portion and the hole wall 121 have a one-piece structure, and the bent portion extends towards a center of the through hole 12. Such a structure may further reduce the stress on the top of the hole wall 121, reduce the occurrence of hole cracks and improve the yield.

Figure 6:
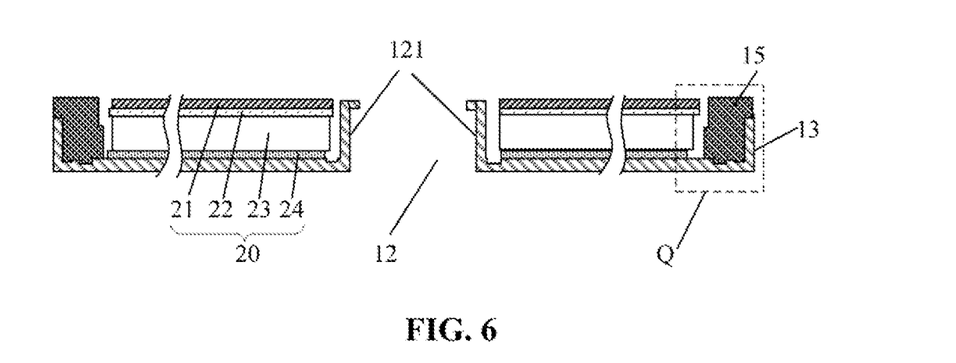
FIG. 6 is a schematic diagram of a backlight module provided in some embodiments of the present disclosure.

FIG. 6 is a schematic diagram of a backlight module provided in some embodiments of the present disclosure. As shown in FIG. 6, the backlight module includes a back plate provided in the embodiments described above.

In addition, the backlight module further includes a backlight source, which may include a light-emitting component and an optical film group. At least a part of the optical film group is located in an accommodating space of the back plate. Illustratively, the optical film group 20 includes a plurality of optical films, and the plurality of optical films may include a reflective sheet 24, a light guide plate 23, a diffusion film 22, and a prism film 21, which are sequentially disposed in a direction distal from the bottom wall 11. At least a part of the light-emitting component, the reflective sheet 24 and the light guide plate 23 are positioned in the accommodating space. Each optical film is provided with an avoiding hole, and the hole wall 121 of the through hole 12 in the back plate penetrates through all the avoiding holes of the optical films.

Figure 7A:
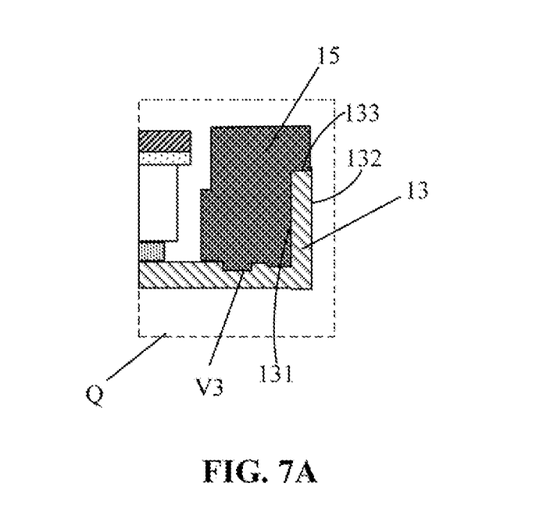
FIG. 7A is an enlarged view of a region Q in FIG. 6.

FIG. 7A is an enlarged view of a region Q in FIG. 6. As shown in FIGS. 6 and 7A, the backlight module further includes a housing 15, wherein the housing 15 is arranged around the optical film group 20. The side wall 13 of the back plate has a first side surface 131, a second side surface 132, and a top surface 133. The first side surface 131 is opposite to the second side surface 132, the first side surface 131 faces the accommodating space, and the top surface 133 connects the first side 131 and the second side 132 together. The housing 15 is in contact with both the first side surface 131 and the top surface 133 of the side wall 13 of the back plate. That is, a part of the housing 15 is located inside the side wall 13 of the back plate and attached to the first side 131; and another part of the housing 15 rests on the top surface 133 of the side wall 13. The housing 15 may be formed on the back plate through injection molding.

Figure 7B:
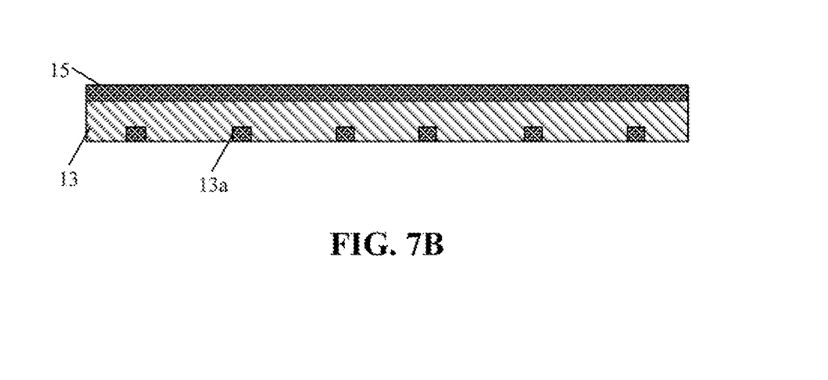
FIG. 7B is a partial side view of a side wall of a back plate and a housing provided in some embodiments of the present disclosure.

FIG. 7B is a side view of a part of a side wall of a back plate and a housing provided in some embodiments of the present disclosure. As shown in FIG. 7B, a glue injection hole 13a is provided in the side wall 13 of the back plate, and during injection molding, glue may be injected into the inside of the side wall 13 through the glue injection hole 13a, so as to form the housing 15. In order to prevent external moisture from entering the accommodating space of the back plate from the glue injection hole, in some embodiments, as shown in FIGS. 2B, 4 and 5, a third groove V3 is provided on a surface of the bottom wall 11 of the back plate close to the accommodating space, a part of the housing 15 is filled in the third groove V3, and at least a part of the third groove V3 is located on a side of the glue injection hole 13a in a thickness direction of the side wall 13. That is, at least a part of the third groove V3 overlaps the injecting glue hole 13a in the thickness direction of the side wall 13. Thus, a route of the external moisture penetrating the inside of the backlight module from the glue injection hole is lengthened, the part of the housing 15 extending into the third groove V3 may effectively block external moisture to prevent the structure in the accommodating space from being eroded by the external moisture.

In some examples, the third groove V3 has a width in a range of 0.1 mm to 0.2 mm and a depth in a range of 0.01 mm to 0.02 mm, thereby improving the moisture and oxygen barrier capability of the backlight module. In addition, the third groove V3 may be an annular structure that surrounds the optical film group 20.

Figure 8A:
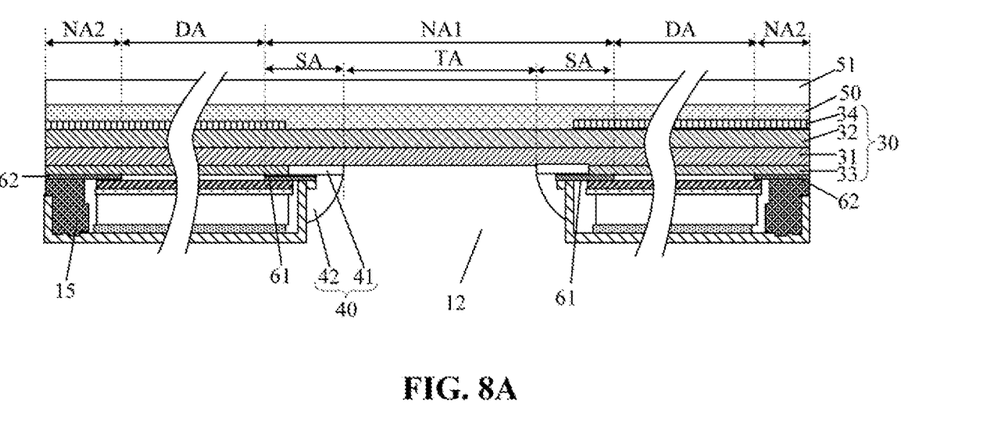
FIG. 8A is a schematic diagram of a display apparatus provided in some embodiments of the present disclosure.

FIG. 8A is a schematic diagram of a display apparatus provided in some embodiments of the present disclosure. As shown in FIG. 8A, the display apparatus includes the above-described back plate and a display panel 30, and the display panel 30 is disposed opposite to the bottom wall 11 of the back plate.

In some embodiments, as shown in FIG. 8A, the display panel 30 is a liquid crystal display panel, which specifically includes an array substrate 31, a color filter substrate 32, a first polarizer 33, and a second polarizer 34. The array substrate 31 and the color filter substrate 32 are disposed opposite to each other, the first polarizer 33 is located on a side of the array substrate 31 distal from the color filter substrate 32, and the second polarizer 34 is located on a side of the color filter substrate 32 distal from the array substrate 31. Where the display panel 30 is a liquid crystal display panel, the display apparatus further includes a backlight source, and at least a part of the backlight source is disposed in the accommodating space of the back plate, which may be specifically referred to the above description and is not repeated herein.

As shown in FIG. 8A, the display apparatus includes a display area DA, a first non-display area NA1, and a second non-display area NA2, wherein the display area DA surrounds the first non-display area NA1, and the second non-display area NA2 surrounds the display area DA. The first non-display area NA1 includes a light transmitting sub-area TA and a light shielding sub-area SA surrounding the light transmitting sub-area TA, the hole wall 121 of the through hole 12 is located in the light shielding sub-area SA, and the housing 15 is located in the second non-display area NA2. Each of the first polarizer 33 and the second polarizer 34 is provided with a hollow out structure, and the hollow out structures in the first polarizer 33 and the second polarizer 34 at least cover the light transmitting sub-area TA.

As shown in FIG. 8A, a first light shielding layer 61 and a second light shielding layer 62 are further disposed between the display panel and the backlight module, and the first light shielding layer 61 is located in the light shielding sub-area SA for preventing light leakage from occurring at the through hole 12. An orthographic projection of the first light shielding layer 61 on the display panel may be within an orthographic projection of the back plate on the display panel 30, or may exceed the orthographic projection of the back plate on the display panel 30. For example, where the back plate adopts the structure in FIG. 4, the orthogonal projection of the first light shielding layer 61 on the display panel 30 may exceed an orthogonal projection of an inner edge of the bent portion 122 on the display panel 30 by less than or equal to 0.12 mm (i.e., a width of an exceeding portion is less than or equal to 0.12 mm). Where the back plate adopts the structure shown in FIG. 5, the orthographic projection of the first light shielding layer 61 on the display panel 30 may exceed an orthographic projection of an inner edge of the hole wall 121 on the display panel 30 by less than or equal to 0.12 mm (i.e., a width of an exceeding portion is less than or equal to 0.12 mm). The second light shielding layer 62 is located in the second non-display area, an orthographic projection of the second light shielding layer 62 on the display panel 30 covers an orthographic projection of the housing 15 on the display panel 30, and the second light shielding layer 62 is used for preventing light leakage from occurring at an edge of the display panel 30.

The hole wall 121 of the through hole 12 of the back plate is provided with an adhesive 40 thereon, the adhesive 40 fixes and bonds the hole wall 121 of the through hole 12 and the display panel 30 together, and an orthographic projection of the adhesive 40 on the display panel 30 is annular and surrounds the light transmitting sub-area TA. An inner diameter of the adhesive 40 is the diameter of the light transmitting sub-area TA. Illustratively, the inner diameter of the adhesive 40 is in a range of 2.15 mm to 4.15 mm, for example, the inner diameter of the adhesive 40 is 2.15 mm, 2.2 mm, 2.24 mm, 2.3 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, or 4.15 mm.

As shown in FIG. 8A, the adhesive 40 includes a first adhesive portion 41 and a second adhesive portion 42, the first adhesive portion 41 is adhered to the first light shielding layer 61, the first polarizer 33, and the array substrate 31, and the second adhesive portion 42 is adhered to the first adhesive portion 41, the first light shielding layer 61, and the hole wall 121. An orthographic projection of the second adhesive portion 42 on the display panel 30 is in a shape of a ring, and a width of the ring is such that the ring may be in contact with the first adhesive portion 41, so that the second adhesive portion 42 and the first adhesive portion 41 wrap the edge of the through hole 12. It should be understood that the width of the second adhesive portion 42 refers to a distance between inner and outer edges of an annular orthographic projection of the second adhesive portion 42 on the display panel 30. In an embodiment, the first adhesive portion 41 and the second adhesive portion 42 each may be light shielding adhesive to prevent light leakage from occurring at the through hole 12. Specifically, each of the first adhesive portion 41 and the second adhesive portion 42 may be made of black light shielding adhesive.

It should be noted that the first adhesive portion 41 and the second adhesive portion 42 may be formed in two steps, respectively. Specifically, in an assembly process of the display apparatus, the first adhesive portion 41 may be formed on the display panel 30, and then the display panel 30 is fixed and connected to the backlight module; then, the second adhesive portion 42 is formed.

As shown in FIG. 8A, the display apparatus may further include a cover plate 51 and an optical adhesive layer 50, where the cover plate 51 is located on a side of the display panel 30 distal from the backlight module, and the cover plate 51 and the display panel 30 are bonded together by the optical adhesive layer 50.

Figure 8B:
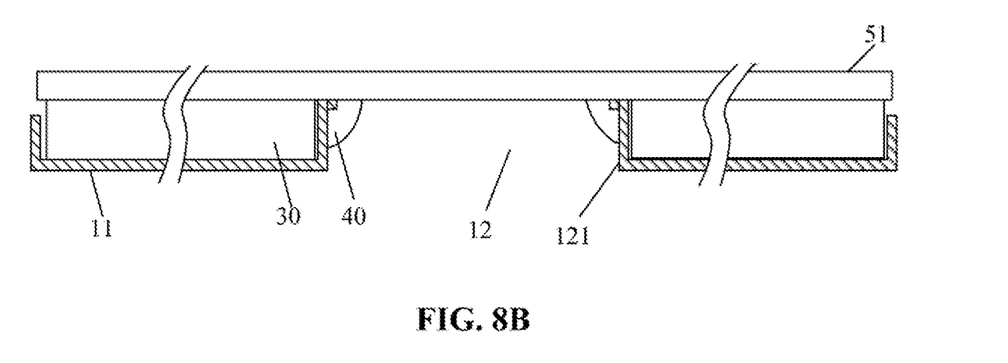
FIG. 8B is a schematic diagram of a display apparatus provided in other embodiments of the present disclosure.

FIG. 8B is a schematic diagram of a display apparatus provided in other embodiments of the present disclosure. As shown in FIG. 8A, the display apparatus includes the above-described back plate and a display panel 30, and the display panel 30 is disposed opposite to the bottom wall 11 of the back plate. Different from FIG. 8A, in FIG. 8B, the display panel may be a self-luminous display panel such as an OLED display panel, a QLED display panel, a QD-OLED display panel, a Mini-LED display panel, or the like. In this case, at least a part of the display panel may be disposed in the accommodating space of the back plate.

As shown in FIG. 8B, the display panel 30 is provided with a mounting hole through which the hole wall 121 of the through hole 12 passes. The display apparatus further includes a cover plate 51, which is disposed on a light outgoing side of the display panel 30. An adhesive is provided on the hole wall of the through hole, and fixes and bonds the hole wall 121 of the through hole and the cover plate 51 together. An orthographic projection of the adhesive 40 on the cover plate 51 is an annular structure, which has an inner diameter in a range of 2.15 mm to 4.15 mm.

Figure 9:
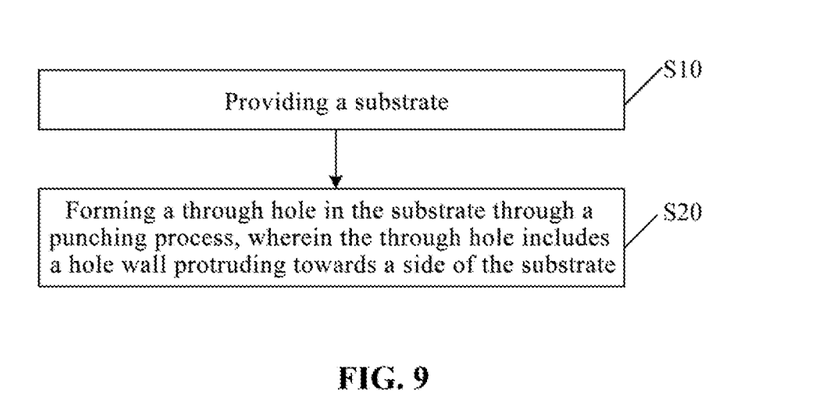
FIG. 9 is a flow chart of a method for fabricating a back plate provided in some embodiments of the present disclosure.

An embodiment of the present disclosure further provides a method for manufacturing the above-described back plate. FIG. 9 is a flowchart of a method for manufacturing a back plate provided in some embodiments of the present disclosure. As shown in FIG. 9, the method for manufacturing a back plate includes:

Step S10, providing a substrate, wherein a material of the substrate includes an aluminum alloy material, such as aluminum magnesium alloy.

Figure 10:
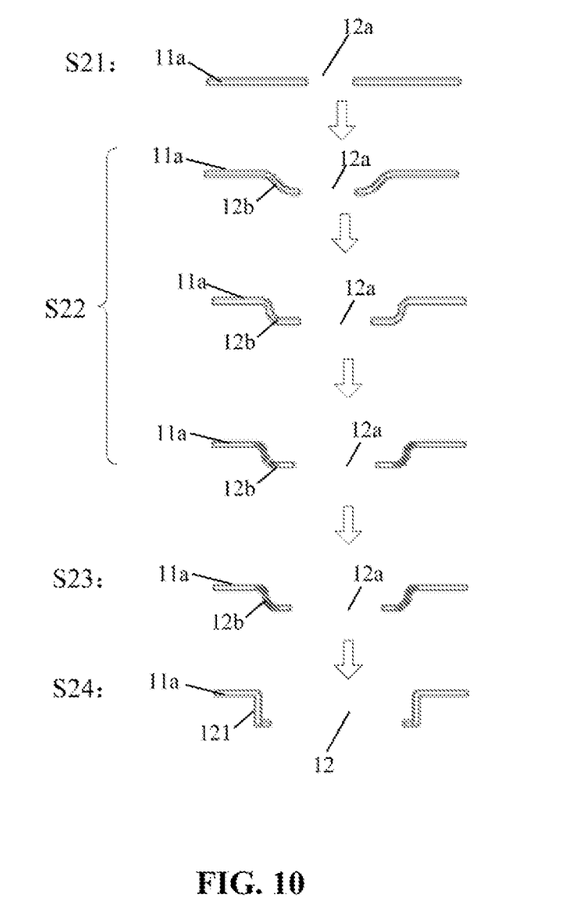
FIG. 10 is a schematic diagram illustrating a procedure for forming a through hole through a punching process provided in some embodiments of the present disclosure.
Figure 11:
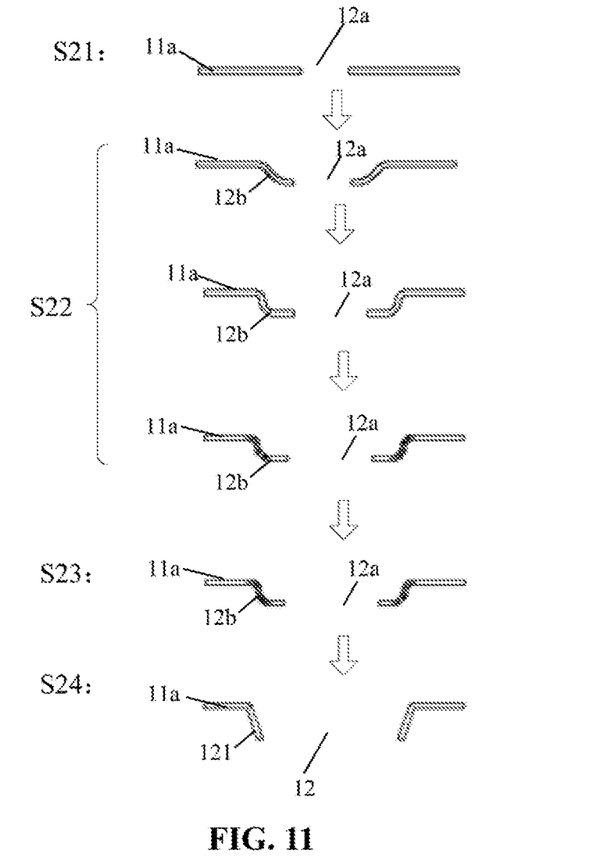
FIG. 11 is a schematic diagram illustrating a procedure for forming a through hole through a punching process provided in other embodiments of the present disclosure.

Step S20, forming a through hole in the substrate through a punching process, wherein the through hole includes a hole wall protruding towards a side of the substrate. FIG. 10 is a schematic diagram illustrating a procedure for forming a through hole through a punching process provided in some embodiments of the present disclosure, and FIG. 11 is a schematic diagram illustrating a procedure of forming a through hole through a punching process provided in other embodiments of the present disclosure. Step S20 includes:

Step S21, as shown in FIGS. 10 and 11, stamping a target area of the substrate 11a for a first time, to form a via 12a penetrating through the substrate 11a.

Step S22, as shown in FIGS. 10 and 11, stamping the target area of the substrate 11a for n times, so that the target area of the substrate 11a is stretched for n times, and a bent portion 12b is formed. The via 12a is located in the bent portion 12b, a coverage of the bent portion 12b and a depth of the bent portion 12b increase with the increase of the times of stamping, and a diameter of the via 12a increases with the increase of the times of stamping, where n is an integer greater than 1. The coverage of the bent portion 12b refers to a range of an orthographic projection of the bent portion 12b on a reference plane, which is a plane where the unbent portion of the substrate 11a is located. In an embodiment, n=3, and the highest manufacturing yield of the through hole 12 may be obtained compared to a case of n being other values.

In some embodiments, n in step S22 may be in a range of 2 to 5, so that the substrate 11a is sufficiently stretched. For example, n is 3, thereby sufficiently stretching the substrate 11a while preventing the procedure from being excessively complicated.

S23, as shown in FIGS. 10 and 11, stamping the stretched target area for a $(n+2)^{th}$ time, so that the coverage and the depth of the bent portion 12b and the diameter of the via 12a all meet target requirements.

S24, as shown in FIGS. 10 and 11, stamping the target area for a $(n+3)^{th}$ time to form the through hole 12. After the $(n+3)^{th}$ stamping, a side wall of the bent portion 12b is formed as a hole wall 121 of the through hole 12.

In some embodiments, each stamping is operated with a punch pin, and the punch pins used in different stampings may be different.

Figure 12:
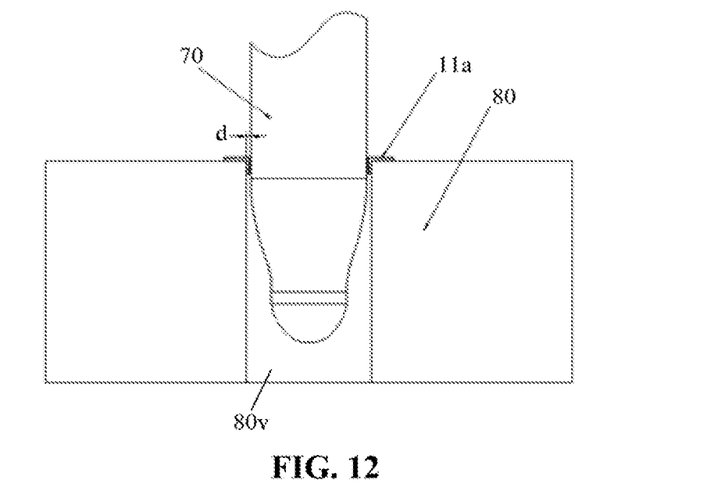
FIG. 12 is a schematic diagram of a specific operation of step S24 provided in some embodiments of the present disclosure.

FIG. 12 is a schematic diagram of a specific operation of step S24 provided in some embodiments of the present disclosure. As shown in FIG. 12, when the target area is molded, the substrate 11a is placed on the die insert 80 having a receiving hole 80v, the bent portion 12b is located in the receiving hole 80v, and the bent portion 12b is stamped by the punch pin 70, so that a shape of the bent portion 12b is adjusted. A certain distance d exists between the punch pin 70 and a top end of the side wall of the receiving hole 80v, and the distance d is greater than a thickness of the substrate 11a. In this case, when the punch pin 70 stamps the bent portion 12b, a gap may be formed between an end of the bent portion 12b distal from the via 12a and the punch pin 70, so as to prevent the bent portion 12 from being cracked due to excessive squeezing of the punch pin 70 against the bent portion 12b. For example, when the thickness of the substrate 11a is 0.1 mm, the distance between the punch pin 70 and the top end of the side wall of the receiving hole 80v is 0.11 mm, and a gap of 0.01 mm may be reserved between the punch pin 70 and the end of the bent portion 12b distal from the via 12a. It should be noted that although a gap is reserved between the end of the bent portion 12b distal from the via 12a and the punch pin 70, an end of the bent portion 12b close to the via 12a is in contact with the punch pin 70, so as to ensure smooth stamping.

It should be noted that FIG. 12 is only described as an example of step S24, and similar operations may be performed for each stamping in other steps, except that a shape of the punch pin used may be different from a shape shown in FIG. 12.

In addition, for the through hole shown in FIG. 4, in step S24, the substrate 11a is subjected to a rotary cutting process by a rotary cutting punch pin, so that a bent portion is formed on the hole wall of the through hole. It should be noted that in the rotary cutting process, burrs extending in a height direction of the through hole are easily formed on edges of the bent portion. In order to prevent the burrs from affecting the display panel 30, a height of the burr may be controlled to be less than or equal to 0.05 mm by controlling process parameters during the rotary cutting. For the through hole shown in FIG. 5, in step S24, it is sufficient to stamp the substrate 11a with a punch pin, and no rotary cutting is required.

In some embodiments, vickers hardness of the punch pin used in every stamping is greater than or equal to 60 and less than 68, thereby reducing fatigue stress of the aluminum alloy material during the process. For example, the punch pin has vickers hardness of 60, 62, 64, or 66. In an embodiment, the punch pin has vickers hardness of 64, to minimize the fatigue stress of the aluminum alloy material during the process.

In some embodiments, a height difference between any two of the four predetermined reference points at the top of the hole wall may be made less than or equal to 0.03 mm, by controlling the process parameters in each stamping. The predetermined reference points are reference points on the top surface of the hole wall (namely, an end surface of the hole wall close to the display panel), and the four predetermined reference points are uniformly distributed along a circumferential direction of the through hole.

In addition, the expression about "range", for example, "in a range of m1 to m2" appearing in the specification includes endpoint values of m1 and m2.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications also fall within the protection scope of the present disclosure.

What is claimed is:

1. A backlight module, comprising a back plate, wherein the back plate comprises:
a bottom wall;
a through hole in the bottom wall, wherein the through hole is provided with a hole wall protruding towards a side of the bottom wall, and the hole wall and the bottom wall are connected together and have a one-piece structure,
wherein materials of the bottom wall and the hole wall each comprise an aluminum alloy material,
wherein the back plate further comprises a side wall connected to the bottom wall, wherein the side wall and the bottom wall have a one-piece structure, and the side wall, the bottom wall and the hole wall define an accommodating space,
wherein the backlight module further comprises a backlight source, and at least a part of the backlight source is in the accommodating space,
wherein the side wall of the back plate has a first side surface, a second side surface and a top surface, the first side surface is opposite to the second side surface, the first side surface faces the accommodating space, and the top surface connects the first side surface and the second side surface together, and
the backlight module further comprises a housing, and the housing surrounds the backlight source and is in contact with the first side surface and the top surface of the side wall of the back plate,
wherein a glue injection hole is formed at a junction between the side wall and the bottom wall, a third groove is formed on a surface of the bottom wall close to the accommodating space, a part of the housing is filled in the third groove, and at least a part of the third groove is on a side of the glue injection hole in a thickness direction of the side wall.

2. The backlight module according to claim 1, wherein the bottom wall is provided with a first groove at a position close to the hole wall, and the first groove is recessed into the bottom wall in a thickness direction of the bottom wall.

3. The backlight module according to claim 1, wherein the bottom wall has a tensile strength in a range of 320 Mpa to 390 Mpa, a yield strength in a range of 200 Mpa to 270 Mpa, a vickers hardness in a range of 100 HV to 120 HV, and an elongation in a range of 12% to 20%.

4. The backlight module according to claim 1, wherein the bottom wall has a thickness in a range of 0.09 mm to 1.01 mm, and the hole wall has a thickness in a range of 0.050 mm to 0.081 mm.

5. The backlight module according to claim 1, wherein a bent portion is formed at an end of the hole wall distal from the bottom wall, the bent portion and the hole wall have a one-piece structure, and the bent portion extends towards a center of the through hole.

6. The backlight module according to claim 5, wherein the through hole has a rectangular longitudinal section.

7. The backlight module according to claim 5, wherein the bent portion is of an annular structure, and a width of the bent portion is in a range of 0.05 mm to 0.15 mm.

8. The backlight module according to claim 1, wherein the through hole has a trapezoidal longitudinal section having two top angles and two bottom angles, each of the two top angles is greater than 90°, and each of the two bottom angles is in a range of 80° to 90°.

9. The backlight module according to claim 1, wherein the hole wall has a plurality of shiny rings thereon, and the number of the shiny rings is greater than 3.

10. The backlight module according to claim 9, wherein the number of the shiny rings is 4 or 5.

11. The backlight module according to claim 1, wherein the hole wall has one shiny band and at least one shiny ring, the shiny band is on a side of the at least one shiny ring close to the bottom wall, and the shiny band has a width greater than a width of any shiny ring.

12. The backlight module according to claim 11, wherein a ratio of the width of the shiny band to the width of any one in the at least one shiny ring is in a range of 1.5 to 4.

13. The backlight module according to claim 1, wherein the first groove has a width in a range of 0.08 mm to 0.12 mm and a depth in a range of 0.01 mm to 0.02 mm.

14. The backlight module according to claim 1, wherein the bottom wall is provided with a second groove at a position close to the side wall.

* * * * *